Feb. 14, 1933.                D. B. ARNOF                1,897,991
                                TONGS
                           Filed July 17, 1931
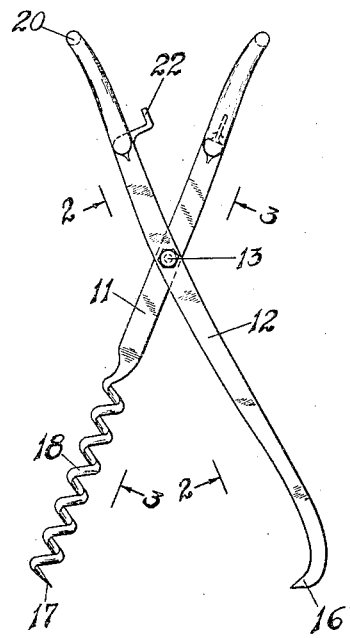
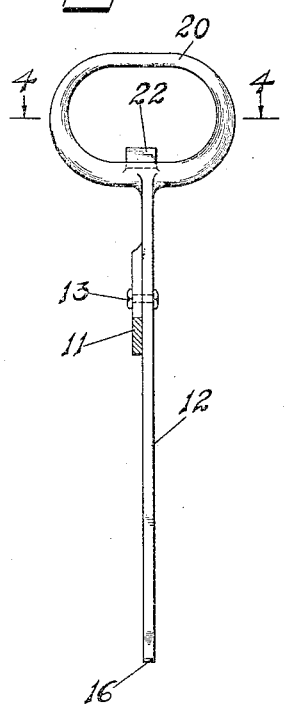
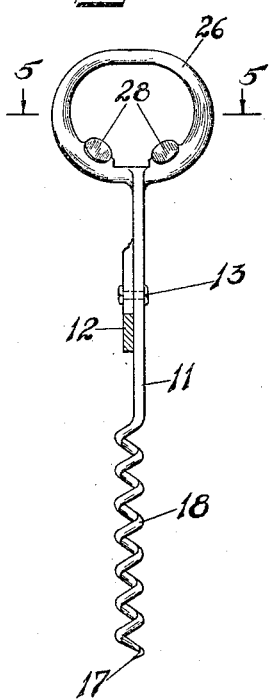
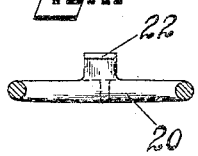
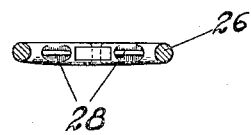
INVENTOR
David B. Arnof
BY his ATTORNEYS
Philipp, Sawyer, Rice & Kennedy Patented Feb. 14, 1933

1,897,991

UNITED STATES PATENT OFFICE

DAVID B. ARNOF, OF NEW YORK, N. Y.

TONGS

Application filed July 17, 1931. Serial No. 551,335.

The present invention relates to combination tools and more particularly to a combination tool including a pair of tongs of relatively small size, for example, for handling small ice cubes, such as those formed in the ice trays of the so-called automatic refrigerators.

In accordance with the present invention, the tongs are formed with a cork-screw element, together with means for removing crown caps, together with means for removing other types of caps, as well as with means for grasping a small ice cube; also, in accordance with the invention, the tongs may include one or more of said elements and means and different combinations of them.

The present preferred embodiment of the invention is illustrated in the accompanying drawing, in which Figure 1 is a side elevation of a pair of ice tongs constructed in accordance with the invention;

Figure 2 is a sectional view thereof, taken on line 2—2 of Figure 1;

Figure 3 is a sectional view thereof taken on line 3—3 of Figure 1;

Figure 4 is a detail sectional view taken on line 4—4 of Figure 2, and

Figure 5 is a detail sectional view taken on line 5—5 of Figure 3.

Referring in detail to the drawing, the tongs of the present invention include two cooperating relatively movable members 11 and 12, pivoted together at 13 intermediate their ends.

The member 12 is formed at its lower end with a pointed gripping portion 16 for cooperation with a pointed gripping portion 17 formed at the lower end of the member 11 and being, in accordance with the present invention, the lower or entering end of a cork-screw 18.

The upper end of the member 16 is formed as a handle portion having the general shape of a flattened ring 20 provided with a projecting lug 22, which, in combination with the handle part 20, acts as a jar or bottle cap remover.

The upper end of the member 11 is formed with a similar and cooperating handle portion 26 having internally thereof a pair of cooperating pinched portions or locks 28, which, in cooperation with the handle ring 26 act as a crown cap remover.

It will be evident that changes of size, shape and proportions may be made, such for example as a decrease or increase in the curvature of the member 12, without departing from the invention as defined by the following claim.

What is claimed is:

A combination tool comprising a pair of tongs comprised of cooperating article-gripping members, one of said members being a cork-screw, having a sharp tip, the other member having a cooperating gripping tip toward which said corkscrew sharp tip is directed.

In testimony whereof, I have hereunto set my hand.

DAVID B. ARNOF.